(12) United States Patent
Kikinis

(10) Patent No.: US 6,778,171 B1
(45) Date of Patent: Aug. 17, 2004

(54) REAL WORLD/VIRTUAL WORLD CORRELATION SYSTEM USING 3D GRAPHICS PIPELINE

(75) Inventor: Dan Kikinis, Saratoga, CA (US)

(73) Assignee: Eagle New Media Investments, LLC, Chicago, IL (US)

(*) Notice: Subject to any disclaimer, the term of this patent is extended or adjusted under 35 U.S.C. 154(b) by 0 days.

(21) Appl. No.: 09/704,387

(22) Filed: Oct. 31, 2000

Related U.S. Application Data
(60) Provisional application No. 60/194,977, filed on Apr. 5, 2000.

(51) Int. Cl.[7] ............................................ G06T 15/00
(52) U.S. Cl. .................. 345/419; 348/169; 342/357.06; 342/357.07; 342/357.13
(58) Field of Search ................................ 345/419, 425, 345/64, 162, 169, 972; 382/103, 107, 276; 348/169, 14.05, 14.07, 155, 170; 342/357.06, 357.07, 357.13, 457; 707/500.1, 501.1

(56) References Cited

U.S. PATENT DOCUMENTS

| | | | |
|---|---|---|---|
| 4,621,259 A | | 11/1986 | Schepers et al. |
| 5,243,418 A | * | 9/1993 | Kuno et al. .................. 358/108 |
| 5,414,773 A | | 5/1995 | Handelman |
| 5,479,268 A | | 12/1995 | Young et al. |
| 5,485,197 A | | 1/1996 | Hoarty |
| 5,532,754 A | | 7/1996 | Young et al. |
| 5,550,576 A | | 8/1996 | Klosterman et al. |
| 5,684,525 A | | 11/1997 | Klosterman et al. |
| 5,704,837 A | | 1/1998 | Iwasaki et al. |
| 5,724,492 A | | 3/1998 | Matthews, III et al. |
| 5,737,028 A | | 4/1998 | Bertram et al. |
| 5,751,282 A | | 5/1998 | Girard et al. |
| 5,808,613 A | | 9/1998 | Marrin et al. |
| 5,818,441 A | | 10/1998 | Throckmorton et al. |
| 5,828,945 A | | 10/1998 | Klosterman et al. |
| 5,841,563 A | | 11/1998 | Effenberger |
| 5,898,429 A | * | 4/1999 | Trom et al. .................. 345/700 |
| 5,900,915 A | | 5/1999 | Morrison |

(List continued on next page.)

FOREIGN PATENT DOCUMENTS

| | | |
|---|---|---|
| JP | 410093880 A | 4/1998 |
| WO | WO 00/01149 A1 | 1/2000 |

*Primary Examiner*—Lance W. Sealey
(74) *Attorney, Agent, or Firm*—Robert J. Depke; Holland & Knight LLP

(57) ABSTRACT

A method of tracking objects that allows objects to be tracked across multiple scene changes, with different camera positions, without losing track of the selected object.

In one embodiment, a method of tracking an object using a computer, a display device, a camera, and a camera tracking device, the computer being coupled to the display device, the camera and the camera tracking device is disclosed. The method includes: A first image from within a field-of-view of the camera is captured. The first image, which includes an actual object with a tracking device, is displayed on the display device. Information about the tracking device's location is received. The information is used to create a virtual world reflecting the actual object's position within the field-of-view of the camera as a shape in the virtual world. Information about the camera tracking device is received. A virtual-camera position in the virtual world is created. A 3D graphics pipeline is used to create a second image, the second image presenting the shape in the virtual world. The second image is used to obtain the actual object's position.

In another embodiment, the method includes using the virtual-camera's position to compute a new position for the camera to track the actual object.

12 Claims, 4 Drawing Sheets

U.S. PATENT DOCUMENTS

| | | |
|---|---|---|
| 5,923,362 A | 7/1999 | Klosterman et al. |
| 5,926,168 A | 7/1999 | Fan |
| 5,929,849 A | 7/1999 | Kikinis ............... 345/327 |
| 5,940,073 A | 8/1999 | Klosterman et al. |
| 5,956,456 A | 9/1999 | Bang et al. |
| 5,977,964 A | 11/1999 | Williams et al. |
| 5,999,167 A | 12/1999 | Marsh et al. |
| 5,999,187 A | 12/1999 | Dehmlow et al. |
| 6,002,403 A | 12/1999 | Sugiyama et al. |
| 6,029,195 A | 2/2000 | Herz |
| 6,043,818 A | 3/2000 | Nakano |
| 6,061,055 A * | 5/2000 | Marks ............... 382/276 |
| 6,072,983 A | 6/2000 | Klosterman et al. |
| 6,075,575 A | 6/2000 | Schein et al. |
| 6,078,348 A | 6/2000 | Klosterman et al. |
| 6,081,271 A | 6/2000 | Bardon et al. |
| 6,167,188 A | 12/2000 | Young et al. |
| 6,205,485 B1 | 3/2001 | Kikinis |
| 6,233,389 B1 | 5/2001 | Barton et al. |
| 6,243,039 B1 * | 6/2001 | Elliot ............... 342/457 |
| 6,271,831 B1 | 8/2001 | Escobosa et al. |

* cited by examiner

REAL WORLD/VIRTUAL WORLD CORRELATION SYSTEM USING 3D GRAPHICS PIPELINE

This application claims the benefit of U.S. Provisional Application No. 60/194,977, filed on Apr. 5, 2000, entitled REAL WORLD/VIRTUAL WORLD CORRELATION SYSTEM USING 3D GRAPHICS PIPELINE.

BACKGROUND OF THE INVENTION

1. Field of the Invention

The invention relates in general to object tracking systems. More particularly, it relates to a method and apparatus for object tracking that involves using a three-dimensional ("3D") graphics pipeline in a novel manner to facilitate manipulation of digital images.

2. Description of the Related Art

The task of tracking objects of interest has applications in many problem domains. In image processing, for example, the tracking of objects through time is a very common task. In the field of computer vision, the tracking of objects is a key component, e.g., for accomplishing robotic tasks in an environment that includes independently moving objects or for accomplishing robotic interception of fast-maneuvering objects. Object (also known as "target") recognition and tracking is an important research area in pattern recognition. Industrial and commercial applications, e.g., those in which vision-based control of motion is feasible only if vision provides reliable control signals, involve object tracking. Moreover, with the continuous advances in wireless communications as well as positioning technologies, tracking the changing positions of objects is becoming increasingly feasible.

The methodologies in tracking moving objects are influenced by the natural environment and motion characteristics. In the case of image processing, the tracking of objects through time normally requires the definition of the object boundaries in order to describe its motion. But such an approach does not always give sufficient information about the position of specific points located on the surface of the object, and this is especially a problem when the shape of the object also changes. In some research, e.g., in the biomedical field, one approach is to restrict the assessment to the motion and morphology of line-like 3D-structures (lines or tubes) by tracking the positions of small segments of such structures in two orthogonal projections, as disclosed in M. Schrijver, J. W. Homan & C. H. Slump, *Estimating The 3D Motion And Morphology Of Line-Like Structures From Orthogonal Projections*, PRoRISC/IEEE 10$^{TH}$ Annual Workshop on 'Circuits Systems and Signal Processing (November 1999). Another approach makes use of a prediction model for moving object velocity and location estimation derived from Bayesian theory, as disclosed in A. G. Bors & I. Pitas, *Prediction And Tracking Of Moving Objects In Image Sequences*, IEEE Transaction on Image Processing, vol. 9 (no. 8), pp. 1441–45 (August 2000).

In pattern recognition, some systems for target recognition and tracking are based on a single sensor, e.g., radar or infrared image sensor. Such single-sensor systems have their limitations. Other target recognition and tracking systems are based on data fusion of radar/infrared image sensors. Data fusion—at a characteristic level—can combine characteristics from different sensors to improve the ability of object recognition. Whereas, data fusion at the decision level can improve the reliability of object recognition.

Object location and tracking systems are particularly useful in asset management systems where continuous identification of the locations of a variety of objects is desired. An invention directed to an RF-energy based object tracking system, using correlation processing to identify a first-to-arrive burst from a tag, and a multilateration algorithm, which is able to identify the locations of objects, is disclosed in U.S. Pat. No. 5,920,287, issued Jul. 6, 1999 to Belcher et al.

A method of tracking a target object using a computer system comprising the steps of capturing a first image using an imaging device, wherein the first image corresponds to the target object, and generating a second image from the first image, wherein the second image also corresponds to the target object, and using a selection signal that corresponds to a selection of the second image is disclosed in U.S. Pat. No. 6,061,055, issued May 9, 2000 to Marks. A tracking strategy that can track a person or other object within a fixed environment using a pan, tilt, and zoom camera with the help of a pre-recorded image database is disclosed in Yiming Ye et al., *Tracking A Person With Pre-Recorded Image Database And A Pan, Tilt, And Zoom Camera*, Machine Vision and Applications, vol. 12 (no. 1), pp. 32–43 (Springer-Verlag, 2000). This tracking strategy, however, requires defining a set of camera states to survey the environment for the target and, during tracking, camera movements are restricted to these states.

A system for monitoring and tracking objects as they traverse a predefined space is disclosed in U.S. Pat. No. 5,973,732, issued Oct. 26, 1999 to Guthrie. Other systems have been used which utilize video cameras and processing devices for tracking objects and individuals. Some example devices are shown in U.S. Pat. No. 5,243,418, issued Sep. 7, 1993 to Kuno et al. A system for detecting and monitoring an area is disclosed in U.S. Pat. No. 5,097,328, issued Mar. 17, 1992 to Boyette. This system is tailored to monitor customer service windows at a bank and uses a combination of blob analysis and motion analysis to determine if a server is on-duty and present at his station, and if he is serving a customer. A system for monitoring the flow of traffic through a designated area, in which a video traffic monitor counts the detected people and records the count according to the direction of movement of the people, is disclosed in U.S. Pat. No. 5,465,115, issued Nov. 7, 1995 to Conrad et al. In this system, an imaginary row of gates is defined, and images filling one or more of these gates are monitored.

As demonstrated in the prior art, many tracking algorithms have been proposed which work well under some conditions, but have easily defined conditions for which they fail. One important problem that has yet to be completely solved is recognizing (tracking) select objects in a scene on a display screen. In this problem space, regional and structural features of objects include shape, texture, color and edges. Existing methods typically require complex and error-prone image-recognition approaches and/or active intervention by an editor, i.e., one editor per object. Such tracking methods often employ artificial intelligence in seeking to do image recognition. When it happens that a moving object has distinct color and a smooth path, a projection of the direction by the artificial intelligence can be used to track the object, within limits. However, if a high-powered zoom lenses is used to follow an object that exhibits erratic motion, then tracking becomes problematic. Also, sudden changes in color can disrupt object tracking. Such limitations in the existing methods effectively preclude the use of real-time object hyperlinking and tracking methods in real-time broadcasts of sports events or other high-motion events, such as car racing.

What is clearly needed is a method of tracking objects that allows objects to be tracked across multiple scene changes, with different camera positions, without losing track of the selected object.

SUMMARY OF THE INVENTION

Accordingly, this invention provides a method of tracking objects that allows objects to be tracked across multiple scene changes, with different camera positions, without losing track of the selected object.

In one embodiment, a method of tracking an object using a computer, a display device, a camera, and a camera tracking device, the computer being coupled to the display device, the camera and the camera tracking device is disclosed. The method includes: A first image from within a field-of-view of the camera is captured. The first image, which includes an actual object with a tracking device, is displayed on the display device. Information about the tracking device's location is received. The information is used to create a virtual world reflecting the actual object's position within the field-of-view of the camera as a shape in the virtual world. Information about the camera tracking device is received. A virtual-camera position in the virtual world is created. A 3D graphics pipeline is used to create a second image, the second image presenting the shape in the virtual world. The second image is used to obtain the actual object's position.

In another embodiment, the method includes using the virtual-camera's position to compute a new position for the camera to track the actual object.

BRIEF DESCRIPTION OF THE DRAWINGS

The present invention is illustrated by way of example, and not limitation, in the figures.

DETAILED DESCRIPTION OF THE INVENTION

A method in accordance with the present invention for object tracking involves using a 3D graphics pipeline in a novel manner to facilitate manipulation of digital images.
3D Graphics Pipelines The 3D graphics pipeline referred to in this patent can be implemented by a combination of hardware elements, known as accelerators, and software. While portions of the pipeline tasks can be performed by software, which is less expensive than hardware, software is typically slower than available hardware solutions. The partitioning between hardware and software may vary, depending upon the processor used and the graphics card in the system. Irrespective of the partitioning between hardware and software, a 3D graphics pipeline performs the method steps described below. The hardware and software that perform the steps described below are referred to simply as a pipeline, without regard to the specific partitioning.

The following is a simplified, general description of 3D graphics pipelines. It is not intended to describe any specific product (e.g., products mentioned later in this patent). Instead, the following description is a general explanation of 3D graphics pipelines in order to assist the reader's understanding.

Currently, graphical objects created using a 3D graphics pipeline can be described as a set of geometric surfaces. One way of constructing a geometric surface in a graphics pipeline is to create a mesh of "primitives." A primitive is a small geometric surface that can be defined by a set of vertices. For example, a primitive can be a polygon such as a triangle or quadrilateral defined within the pipeline in terms of the locations of its vertices in x, y, z coordinate space. Whereas a set of primitives can be used to define a larger 3D surface.

Instead of using primitives, such as polygons, some graphics pipelines can process geometric surface areas defined in other ways, e.g., by mathematical equations. This approach for defining geometric surface areas is referred to as an "implicit" technique. As explained below, existing techniques for defining geometric surface areas can be used to perform a method in accordance with the present invention.

Figure 1A:
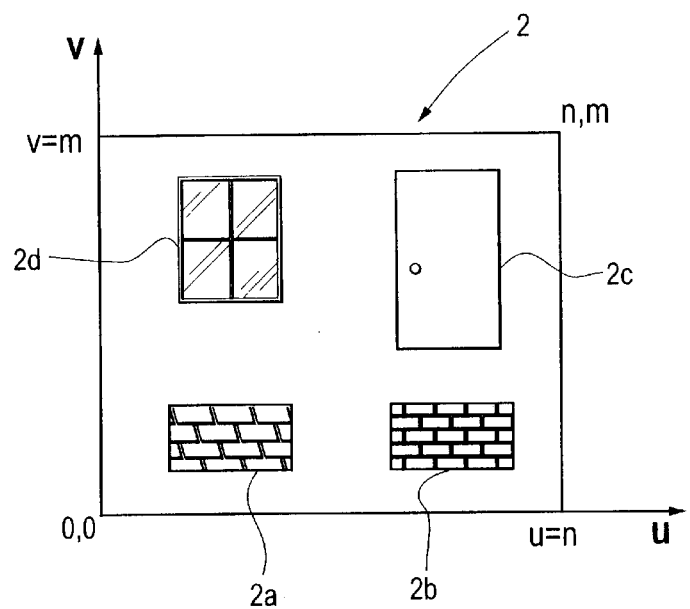
FIGS. 1A to 1E illustrate the operation of a 3D graphics pipeline.

A graphics pipeline that processes geometric surface areas using triangular primitives is described below. Other types of graphics pipelines are discussed later. In this first example, a 3D graphics pipeline constructs a 3D image of an object from a 2D pixel array, generally known in the art as a "texture map." In FIG. 1A, image 2 illustrates a 2D image of a set of texture maps, representing portions of a house. As will be explained below, this set of texture maps is used to create the image of an object. FIG. 1A includes portion 2a that has the appearance of bricks; portion 2b that has the appearance of roof shingles; portion 2c that has the appearance of a door; and portion 2d that has the appearance of a window. Image 2 is stored in a digital memory in the form of an array of pixels. Each location in the memory stores a pixel, which is one or more words of data indicating the color, color saturation and brightness corresponding to that pixel. The location of the pixels within the array is typically referred to as u, v coordinates. The u, v coordinates are similar to x, y coordinates of the Cartesian coordinate system. In FIG. 1A, the pixel array is an "n×m" array, where n and m are integers.

As mentioned above, FIG. 1A represents a pixel array. Physically, the array comprises data loaded into a memory.

Figure 1B:
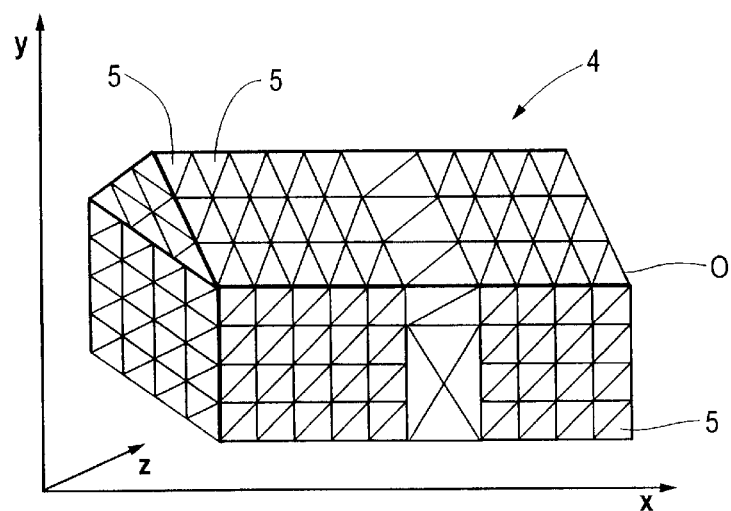

The next step in the process is to provide or prepare a geometric surface. In FIG. 1B, the geometric surface is in the form of a mesh 4 of primitives 5, in 3D space. While in FIG. 1B the primitives are triangles, other types of polygons can be used. The mesh of primitives represents a three-dimensional shape of an object O in 3D space. Object O is the shape of a house. The position of each vertex of each triangle within mesh 4 is stored in a memory in the form of x, y, z Cartesian coordinates, relative to the object. These coordinates are sometimes referred to as model coordinates. The process of preparing such a mesh is well-known and described in standard graphics libraries, such as Real 3D, published by Real 3D, Lockheed Martin Corporation (1996), and *Direct* 3D, New Riders Publishing (1997).

In FIG. 1B, mesh 4 is a representation of what is stored in a digital memory, and it does not represent what is actually displayed. More specifically, what is stored in the memory is the locations, in terms of x, y, z coordinates, of each vertex within mesh 4.

The next step is to map or "bind" the two-dimensional texture map of FIG. 1A onto mesh 4 of FIG. 1B. This is accomplished by mapping each triangle vertex to a location in the texture map. In effect, a list of data points is prepared that associates each vertex of mesh 4 to the u, v coordinates of a particular point (pixel) in the texture map of FIG. 1A. The locations in the texture map to which the vertices are bound are sometimes referred to as "control points." This portion of the process may be analogized to an upholsterer choosing a piece of fabric and binding it with a few nails to the corner of a couch being upholstered (the nails akin to control points). The upholsterer subsequently instructs an apprentice to finish attaching the fabric to the couch. Similarly, the 3D graphics pipeline is instructed to finish the task of mapping a texture map. Thus, FIGS. 1A and 1B describe the process by which one texture map is mapped onto one mesh representing one object. A graphics pipeline can also be used to map at least one texture map onto the same or several different objects.

Figure 1C:
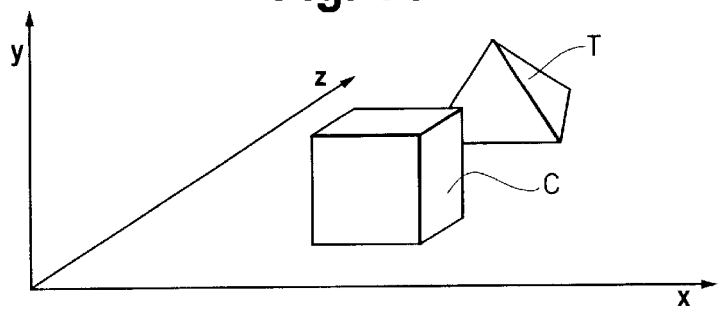

The next step in the process is to set up a "world coordinate model" of the various objects to be displayed. This requires establishing a position and directional orientation for each object to be displayed. FIG. 1C, for example, depicts two objects to be viewed: a tetrahedron T and a cube C. The pipeline is instructed that cube C is to be facing in a certain direction and is to be located partially in front of tetrahedron T relative to a certain frame of reference. The graphics pipeline sets up processing of the model coordinates in accordance with the parameters of the position and orientation of the object.

Figure 1D:
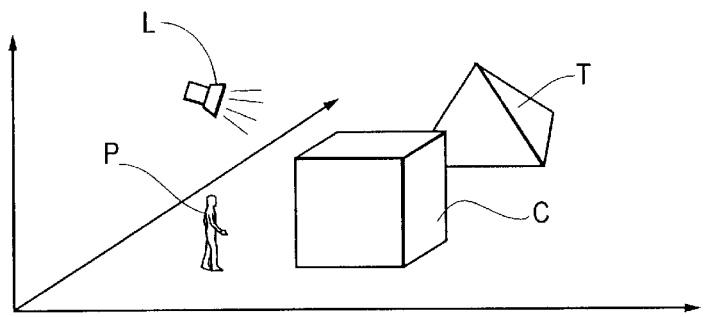

The next step is to select a frame of reference. For example, suppose that the viewer's preference is to observe the objects from a position corresponding to a corner of the world coordinate model (e.g., position P as shown in FIG. 1D). This necessitates that a virtual viewpoint, viewing direction, and aperture be selected. The parameters associated with the viewer's preference define the screen coordinate system. Further, it might be decided the viewer's preference is to observe these objects with a light source located at a position L. The graphics pipeline will set up another processing pipe to process the world coordinate data into the screen coordinate data which will cause a computer screen to display the image as it would be perceived by the observer at position P. In other words, the computer screen will provide an image of tetrahedron T and cube C as would be observed by a viewer if he or she were standing at position P and a light source were present at location L. This image will be provided initially as a pixel array in a frame buffer and then displayed by the computer screen. The image in the frame buffer is refreshed, i.e., regenerated according to the specifications programmed into the pipeline, typically at about 50-to-120 times per second. There are many different methods for optimizing the graphics pipeline, including minimizing the time spent processing the hidden parts of the objects, such as the backside of cube C facing away from the viewer. Such details are well-known to those skilled in the art and are not discussed in detail here.

During this process of constructing the pixel array and providing it in the frame buffer, the graphics pipeline: a) fetches the portion of texture map 2 "tacked" to the vertices of mesh 4 (and therefore stretched over each triangle); b) determines how and where that portion of the texture map should appear, given the orientation of the triangles relative to the viewer and the location of the light source; and c) constructs the appropriate bit map pixel array for storage in the frame buffer. The contents of this frame buffer are then displayed as an image on a computer screen.

Figure 1E:
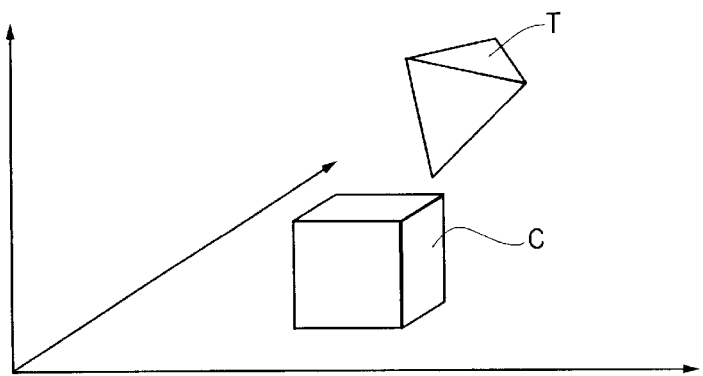

At this point, the 3D graphics accelerator permits a user to manipulate the displayed objects in any desired manner. For example, as shown in FIG. 1E, if one wants to rotate the image of tetrahedron T by 45°, the 3D graphics accelerator facilitates this manipulation. This is accomplished by providing a new set of parameters in the world coordinate model for the graphics pipeline that indicate the new position and orientation for tetrahedron T. Thereafter, the next time the graphics pipeline regenerates the image stored in the frame buffer the regenerated image will reflect the rotation of tetrahedron T by 45°.

In another example, suppose that the task is to display a scene as if the viewer had taken ten steps forward from his or her location at position P. The next time the graphics pipeline regenerates the image, it will generate and store another pixel array in the frame buffer corresponding to what would appear to such a viewer, and this pixel array is provided as another image on the computer screen.

As is well recognized, a graphics pipeline is particularly useful in applications such as video games, where it is required to simulate what would appear to a game player who is wandering past a set of objects.

As mentioned above, some graphics pipeline create models of geometric surfaces using an implicit technique. These surfaces are often described as a function of the position coordinates, f(x,y,z), or can also contain some vertices. Control points and additional formulas associated with such surfaces are used to bind a digital pixel array (e.g., an array as shown in FIG. 1A) to the implicitly defined surface, and the process proceeds as described above. The major difference is that instead of defining surface areas in terms of primitives with vertices, the surface areas are defined in terms of mathematical equations.

Figure 2:
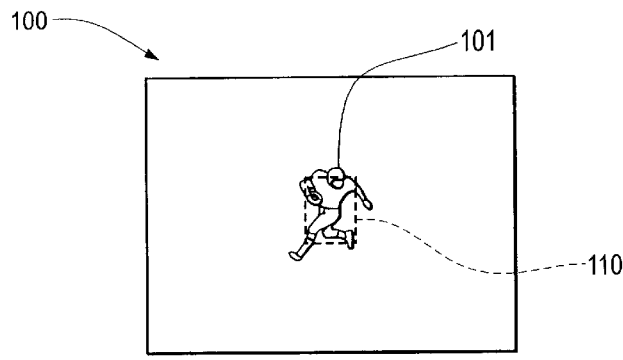
FIG. 2 is a simplified picture of object tracking.

FIG. 2 illustrates an object 101, representing a player, tracked by an object box 110. Object box 110 can have many different shapes and sizes and can be visible or not. There are several prior art patents regarding this tracking method.

All of these methods try to reduce the amount of human intervention necessary to track objects. Particularly, for example, in a crowded football field, where many players with the same color uniform are repeatedly crossing in front of each other, it becomes all but impossible to use video recognition for tracking an object because no object is quiet for the time required for accurate video recognition, and because of the crossing motions of similar-colored objects, and the fact that the color pattern presented may change according to the angle, at which a player is seen, due to markings on their shirts. Therefore, the use of pattern recognition is ill-suited.

A drawback in existing methods is that at cross-over, scene change, or other similar change, an editor must tag the correct label and object tracker onto the actual object. Hypothetically, an event such as a football game would thus require at least as many editors as there are football players in the game, because each editor can realistically track only one object at a time. But if a tracking editor even blinks, he or she may track the wrong object, particularly, when the player's name/number is not visible. In practice, such one-editor-to-one-object type tracking is not a workable solution, due to its costs.and limited usefulness.

Figure 3:
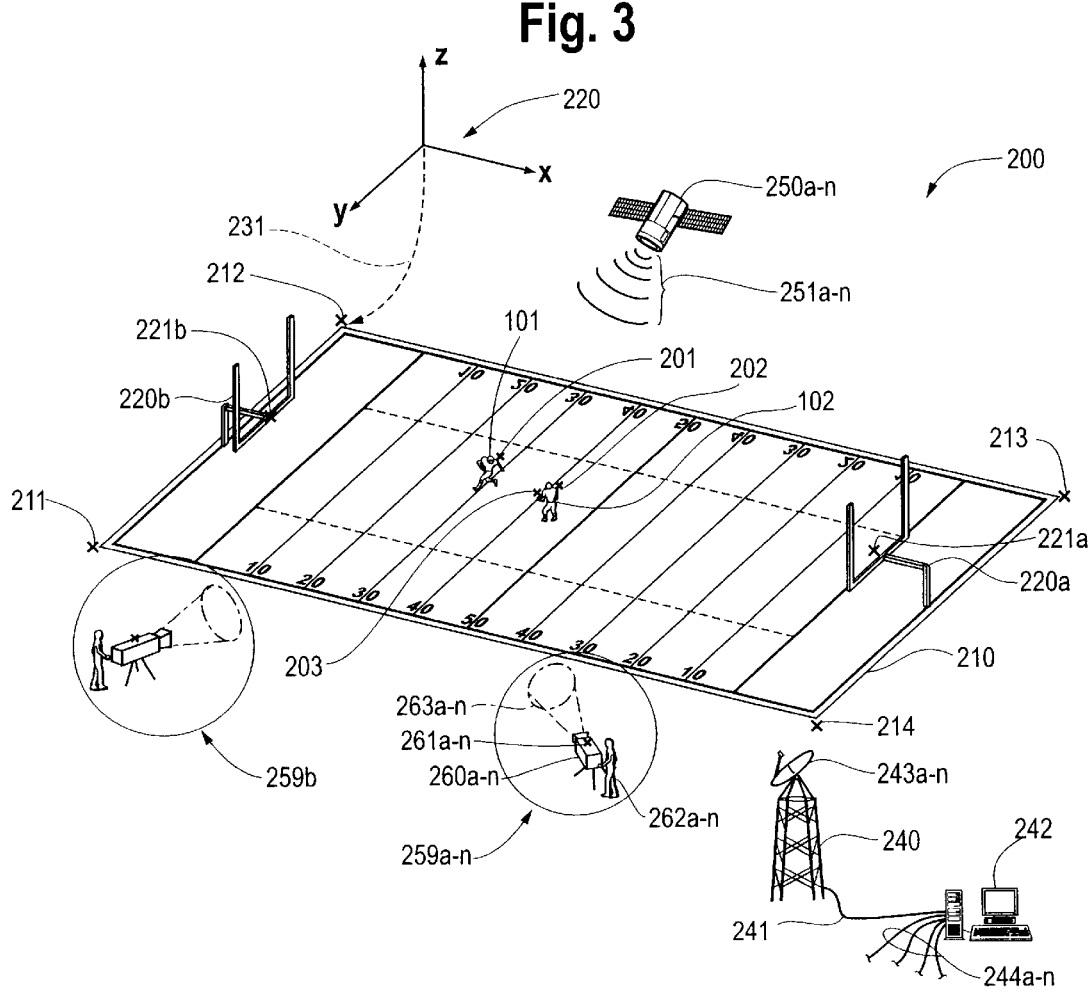
FIG. 3 shows a pseudo-isometric view of a game field.

FIG. 3 shows a simplified, pseudo-isometric view of a playing field 210 with goals 220a and 220b and players 101 and 102. Also shown are camera set-ups 259 a through n (two are shown, 259a and 259b). Each camera setup has a corresponding camera 260, a camera operator 262, a camera tracking device 261, and shows a symbolic cone or pyramid representative of the viewing field projected as a cone 263. The viewing field or zoom lens focus determines which portion of the field can be viewed.

Also shown is a superimposed imaginary x, y, z coordinate system 230 that would be anchored in a corner with tracking device 212 as indicated by broken line 231.

The goals have tracking devices, in each corner of the field is a tracking device, each player has his own tracking device 201 and 202, and the football also has tracking device 203.

The tracking devices used by the cameras are special. They provide not just location data of the camera, but also the orientation of each camera given as a vector and the zoom or the view field used, as the length of the vector.

There must be some kind of functional relationship between the length of the vector and the visible field. The relative function can be linear or inverse or any kind of other function as long as it can resolve what is actually within the view field of the camera. It can be the zoom factor, the focal point length, or any of a number of factors, as long as it creates a defined relationship.

A radio tower 240 (only one shown) and a computer 242 (only one shown) are connected together by a link 241a. Links 244a through n may be connected to radio locators 211 through 214, and radio beams 243 a through n may connect locating devices or responders that are not wired, such as the ones on the players, the ball, and other objects. In some cases, antenna arrays may be used.

Additionally shown is a satellite 250 a through n (only one shown) with emitted satellite signals 251 a through n. These signals are sent down using the method employed by GPS satellites and can be used by the beacons to determine their respective locations.

Each object continuously re-evaluates its position, either by receiving GPS signals and re-transmitting those signal coordinates with an ID, or, for example, by using the (four) corner stations 211, 212, 213 and 214 and radio telemetry devices that make it possible to locate each object. Radio telemetry is well known in the art, and it offers various ways of locating objects. Different techniques are available and shall be considered equal as for use with the invention.

Another embodiment would use a single radio tower with echo analysis, as recently developed for cell-phone locating devices. Such methods permit location of an object with accuracy of a few feet. Whereas GPS and other multi-point radio telemetry methods can return the location of an object with an accuracy a few inches, or even a fraction of an inch.

All the data collected from players, cameras and inanimate objects (such as goals) or moving objects (such as a float, not shown) is transmitted to computer 242, which then constructs a virtual copy of the playing field, reflecting the playing field of the real world.

Figure 4:
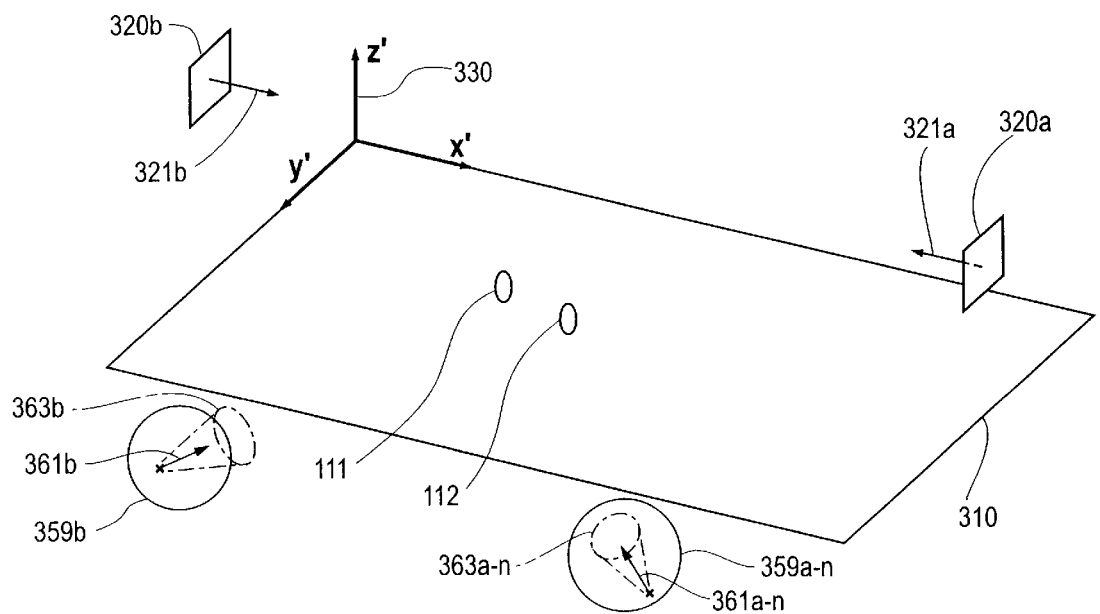
FIG. 4 shows an isometric view in virtual space of a game field, representing the game field of FIG. 2.

FIG. 4 shows the virtual world of a playing field 310, which is a simple geometric surface. Coordinate system x', y' and z' 330 in the virtual world reflects the x, y, z coordinate system of the real world. Egg-shapes 111 and 112, i.e., rough body approximation without limbs, are objects representing players 101 and 102.

Egg-shapes 111 and 112 follow the location indicated by transmitter 201. Using a virtual camera position in the virtual world (virtual camera positions 359 a through n, again with virtual camera vector 361 and view angle 363, indicated by the cone), an image can be generated that shows the known objects in a pseudo TV picture, which is what is normally used to generate 3D images of a virtual environment for viewing on a 2D screen in the real world. (Some terms used herein are liberally applied, and refer to world coordinates and viewer position in 3D terminology.)

Figure 5:
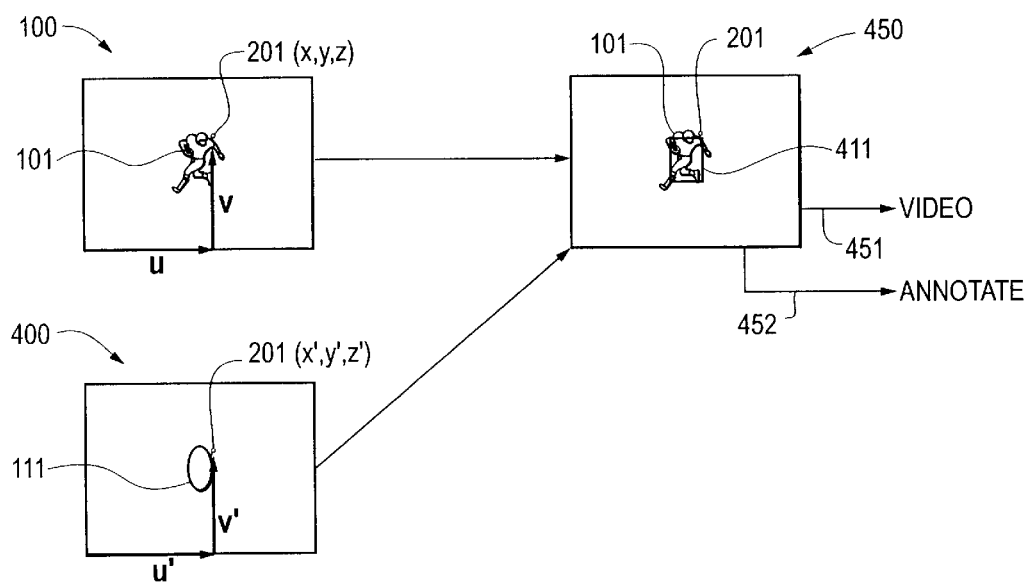
FIG. 5 shows the extraction and combination process that results in an annotated video stream containing object tracking information.

FIG. 5 shows screen 100, which is basically the same as screen 100 in FIG. 1, except that shown attached to player 101 is a transponder or transmitter device 201 (in practice, probably hidden from sight), and screen 400 is the output generated by the 3D pipeline-view corresponding to the real world. This is a view of the simplified virtual 3D world. All the objects are in exactly the same location as they appear (on screen 100) in the real world. As the cameras in the real world move, the viewpoint and or angle and or zoom factor of the virtual viewer is moved synchronously, so the image section seen on screen 400 is equivalent to the image section seen on screen 100. In the case of a scene change to another camera, the virtual world may be instantaneously re-configured to reflect the new situation (e.g., camera moves from one end of field to other, or moves from football field to baseball field). There may be a use of anti-jitter and zoom-lens correction software. In the case of zoom-lens correction, for each camera, a test object is observed in a known position with different zoom factors in a few positions of the viewing field (e.g., corners and center), and corrections may be done on a camera-by-camera basis. High-powered zoom lenses may exhibit some non-linear behavior, and each camera may have its own characteristics, which can be corrected by doing such pre-use calibration. That may include adjustments for temperature and humidity, as well as other environmental factors. For example, the actual object and the virtual object may not register to one another in certain zoom positions, or screen areas, and correction tables can be established to allow correction of such deviations by using, for example, linear interpolation, or multipole spline curves, or other suitable technique.

Element 201 reflects the location in image 100 of tracer object 201 in space as x, y, z, but is transmitted as coordinates u and v on the TV screen, as television is 2D only. Accordingly, the 3D pipeline will translate the coordinates x', y' and z' of the virtual representation of object 201 into the coordinates u' and v', which is the location where object 111, an egg-shaped sphere (or other suitable shape or representation), replaces the player. An object box 411 can now move in sync with sphere 111.

Clearly, by overlaying the two objects, an image can be obtained such that the tracking element 201 traces player 101 accurately at any given time, even through scene changes and camera motion and so forth, because the virtual world will reflect all the positions of actual objects in the real world through the transmission of the radio locators including the camera, view direction, zoom factor, and other factors.

Because TV video has a refresh rate of approximately 15-to-20 ms per frame (or half frame), a transmission update rate of approximately 10-to-15 ms by the tracking devices is sufficient to ensure that each frame contains the correct position, no matter how quickly tracked objects move and how many scene changes occur in between.

Obviously as scene changes occur in transmission headquarters, such changes must be communicated to computer 242, so it can activate the correct virtual camera in the virtual world, or even the correct virtual world. For example, a baseball scenario requires two world models, one for each field and its associated cameras (not shown). Also, overlays may be done by overlaying multiple models of the same world within one another, such as a train in a landscape, where one world might be the layout of the train, and the other layout is the world in which the train moves.

The result is that any given object can be tracked accurately in real time through multiple screen changes, with multiple scene changes, multiple camera change and so forth, without problem, as well as through object cross-overs (e.g., when one player runs in front on another player), where normal tracking devices would be guaranteed to fail.

In regards to transponders, there are several possibilities, depending on the realm and or expanse of the device and its field of use. For example, in car races, an implementation using cell phones and GPS devices would be preferred, attached to the car or to the helmet of the driver. On the other hand, for a studio set, possibly a simple RFID pack with remote scanning could be used for each object to be tracked. Such devices are extremely inexpensive. They could be attached to the belts or attached to or integrated into the microphone devices of the personnel on the set.

As for games and other sporting events, any kind of radio telemetry and/or GPS or combination can be used. In cases where GPS may not be quick enough for accurate measurement, GPS may be used to recalibrate the radio telemetry measurements on a regular basis, but the interpolation on a fast pace is done through radio telemetry.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:

receiving data identifying a real-time physical location of an object, the object including a tracking device;

receiving data identifying a real-time field of view for a camera, the data includes a length vector within the view of the camera indicating a distance between the camera and the object, the camera including a tracking device;

generating a three-dimensional (3D) image representing the object as viewed within the field of view of the camera, the 3D image generated based on the data identifying the real-time location of the object and the real-time field of view of the camera;

adding an object ID, associated with a link, to the object represented in the 3D image; and joining data from the 3D image including the object ID with a video image that includes the object as received from the camera, wherein the video when displayed thereafter includes the object ID, associated with the link, to the object represented in the video.

2. The method of claim 1, wherein the object ID, associated with the link, represented in the video is not displayed.

3. The method of claim 1, wherein the object ID, associated with the link, represented in the video is displayed as an icon, the icon when activated retrieves data which is displayed.

4. The method of claim 1, wherein the data identifying the real-time field of view for the camera, includes focus information relating to the field of view for the camera.

5. The method of claim 4, wherein the focus information relating to the field of view for the camera, includes a length vector within the view of the camera indicating a distance between the camera and the object.

6. The method of claim 1, wherein the receiving data identifying the real-time physical location of the object and the receiving data identifying the real-time field of view for the camera, includes receiving the information via Global Positioning Satellite.

7. A computer readable storage medium containing executable computer program instructions which when executed perform a method comprising:

receiving data identifying a real-time physical location of an object, the object including a tracking device;

receiving data identifying a real-time field of view for a camera, the data includes a length vector within the view of the camera indicating a distance between the camera and the object, the camera including a tracking device;

generating a three-dimensional (3D) image representing the object as viewed within the field of view of the camera, the 3D image generated based on the data identifying the real-time location of the object and the real-time field of view of the camera;

adding an object ID, associated with a link, to the object represented in the 3D image; and joining data from the 3D image including the object ID with a video image that includes the object as received from the camera, wherein the video when displayed thereafter includes the object ID, associated with the link, to the object represented in the video.

8. The computer readable storage medium of claim 7, wherein the object ID, associated with the link, represented in the video is not displayed.

9. The computer readable storage medium of claim 7, wherein the object ID, associated with the link, represented in the video is displayed as an icon, the icon when activated retrieves data which is displayed.

10. The computer readable storage medium of claim 7, wherein the data identifying the real-time field of view for the camera, includes focus information relating to the field of view for the camera.

11. The computer readable storage medium of claim 10, wherein the focus information relating to the field of view for the camera, includes a length vector within the view of the camera indicating a distance between the camera and the object.

12. The computer readable storage medium of claim 7, wherein the receiving data identifying the real-time physical location of the object and the receiving data identifying the real-time field of view for the camera, includes receiving the information via Global Positioning Satellite.

* * * * *